March 13, 1945. J. N. KRISTICH ET AL Re. 22,619

CONCRETE PIPE MAKING MACHINE

Filed Oct. 9, 1944 3 Sheets-Sheet 1

Inventors:
John N. Kristich and
Nikola B. Piriach
by John G. Rainsmith
Attorney

March 13, 1945. J. N. KRISTICH ET AL Re. 22,619

CONCRETE PIPE MAKING MACHINE

Filed Oct. 9, 1944 3 Sheets-Sheet 2

Inventors:
John N. Kristich and
Nikola B. Piriach
by John A. Rainsmith
Attorney

March 13, 1945. J. N. KRISTICH ET AL Re. 22,619

CONCRETE PIPE MAKING MACHINE

Filed Oct. 9, 1944 3 Sheets-Sheet 3

INVENTORS
John N. Kristich
Nicholas B. Piriach
John A. Rairsmith
ATTORNEY

Reissued Mar. 13, 1945

Re. 22,619

UNITED STATES PATENT OFFICE 22,619

CONCRETE PIPE MAKING MACHINE

John N. Kristich, Watsonville, and Nikola B. Piriach, Cupertino, Calif.

Original No. 2,130,551, dated September 20, 1938, Serial No. 97,360, August 22, 1936. Application for reissue October 9, 1944, Serial No. 557,886

8 Claims. (Cl. 25—37)

While concrete pipe making machines have been in use for some time it has been the custom to make them large and massive in order to give them stability and eliminate insofar as possible all vibration during the period of time when in operation. This means, of course, that the machines take up an excessive amount of floor space, that they are costly to build, and that installation is an expensive procedure, yet experience has proven that the desired elimination of vibration has not been satisfactorily effected. Furthermore the machines heretofore used are inefficient in that the tamper bar is so mounted that it does not run perfectly true to the position set, and consequently the perfect uniformity of texture of the pipe is not secured.

It is, therefore, one object of the present invention to provide a machine of the character indicated that will occupy but little floor space, and that is so constructed that practically all vibration is eliminated when the machine is in operation.

It is another object of the invention to provide a machine of the character indicated that may be quickly, easily and simply adjusted for the manufacture of any desired size of pipe.

It is still another object to provide a machine in which the tamper bar will be perfectly true in operation and not disturb the reinforcement when reinforcing material is being used in the pipe.

It is still another object to provide a machine that will turn out the finished pipe faster than those machines heretofore used, that will be economical to build and to install, and that will be strong, durable, and highly efficient in its practical application.

Figure 1:
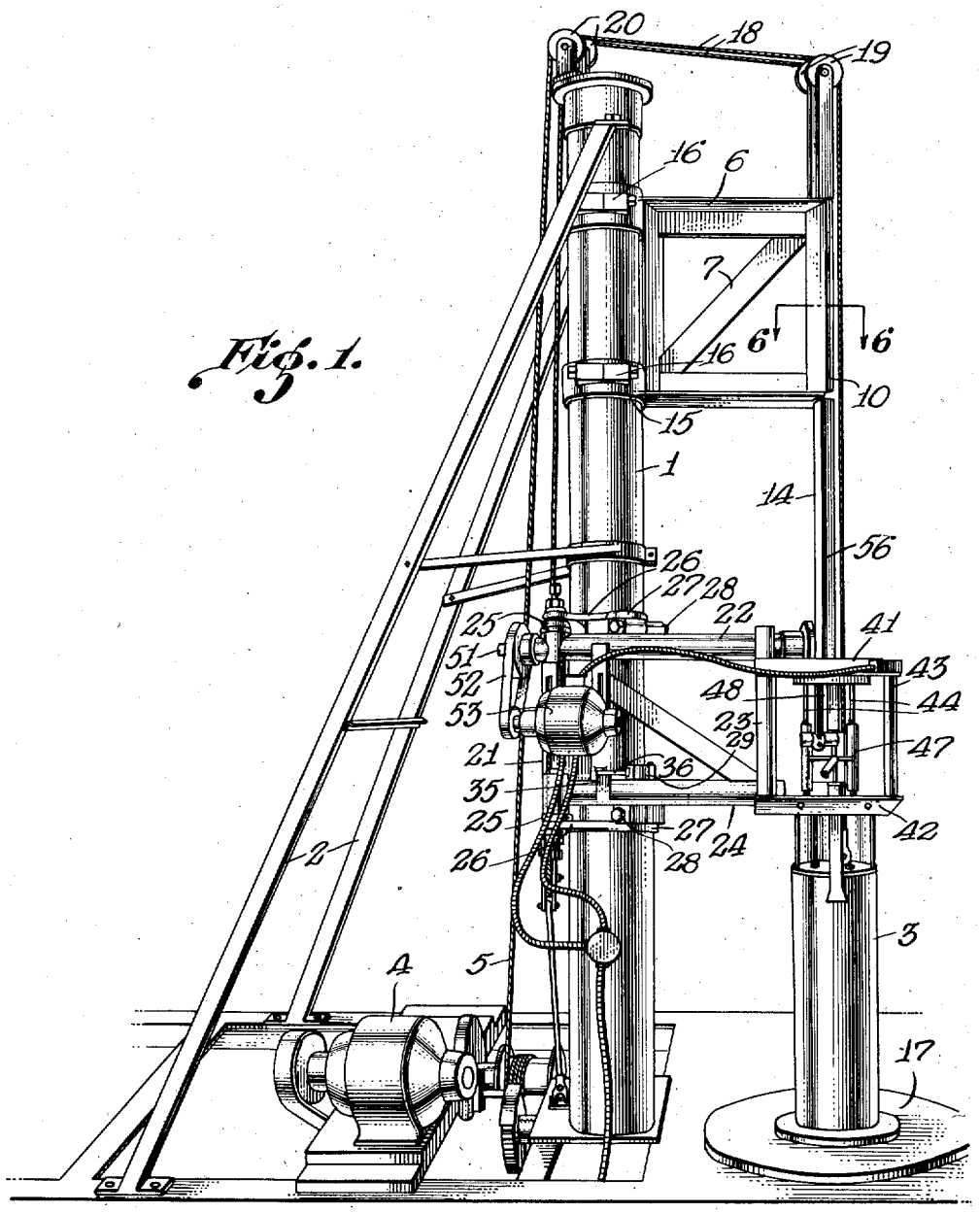
Figure 1 is a perspective view of a machine embodying our invention.
Figure 2:
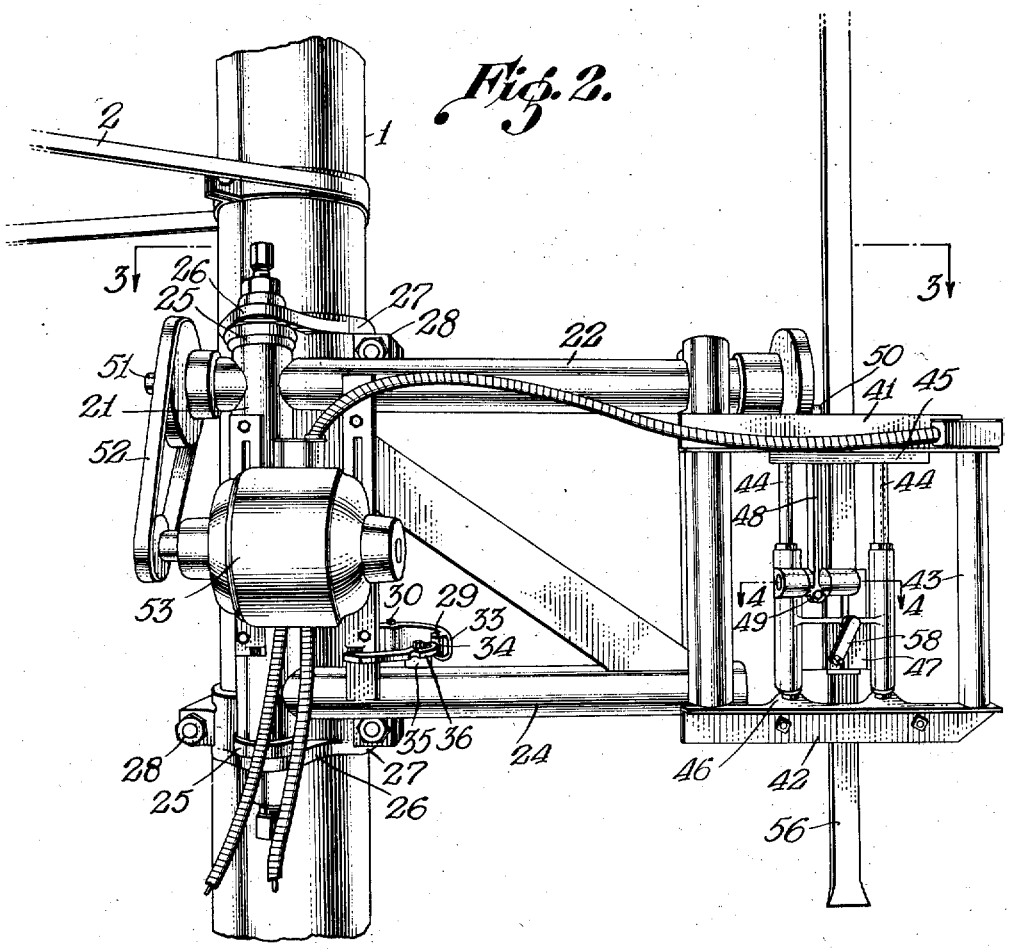
Figure 2 is an enlarged view of the adjustable tamping mechanism.

In the specific embodiment of the invention herein disclosed we show at 1 a vertical disposed hollow cylinder or pipe. This pipe is the main support or body portion of the machine and is maintained rigid in operative position by stays or braces as 2.

The core 3 about which the pipe is formed is raised and lowered as desired by block-and-tackle mechanism operated by a motor 4, this mechanism being shown in part only and indicated generally at 5.

The supporting and positioning means for the core 3 however is important to this invention and comprises the following structure. A frame is built up of two identical sub-frames welded together, each sub-frame comprising four angle irons joined in a rectangular formation as indicated at 6 and braced by a bar 7 and having the forward bar formed to present a vertical angular face as 8 and a flange as 9. At 10 is a face plate formed to present two angular faces as 11 in opposed relation to faces 8 and flanges 12 to seat against flanges 9 and to which they are bolted. This construction forms a vertical guide 13 that is rectangular in horizontal cross-section and in which the coreholder 14 slides. On the frames so formed are mounted collars 15 which are adjustably mounted on the cylinder 1 as at 16.

By means of the construction described a cheap and strong means is provided for accurately positioning the core holder 14 in axial relation to the rotatable table 17 upon which the core rests, the driving means for the table not being shown.

The cables 18 forming a part of the block-and-tackle mechanism are attached to the top of the core 3 and pass over sheaves as 19—20 mounted on the top of the frame 6 and cylinder 1 respectively.

The tamper frame is built up of pipes 21—22—23—24 joined in rectangular formation.

The pipe 21 forms the supporting end of the frame and is fitted at top and bottom with ball bearings as 25 which are mounted in brackets as 26 on collars 27, the collars being adjustably mounted on cylinder 1 as at 28 to permit the vertical adjustment of the frame for varying lengths of pipe, if found desirable. This construction permits swinging of the frame in a horizontal plane to bring the tamper bar into position for any desired diameter of pipe.

To hold the frame in a selected position we provide a resilient arm 29 pivoted as at 30 on the lower collar 27, desired resiliency being obtained by means of an adjusting screw 31 mounted in the end adjacent the pivot and bearing against a lug 32 on the collar. The other end of the arm terminates in a head 33 in which is journaled a roller 34.

On a boss 35 on the lower pipe 24 of the frame is mounted a member 36, this member being arculate in form and concentric with the axis of supporting pipe 21 and has a slot 37 formed therein. The member is adjustable on boss 35 through the medium of bolts 38 engaging the said slot. In the outer edge of member 36 are formed sockets as 39 in which the roller 34 seats. Considering the frame to be shown in the position when the smallest size pipe is to be made, any larger size may be made by swinging the frame in the direction indicated by arrow 40 and adjusting the member 36 so that the roller seats in the socket in that position, where it is securely held.

The tamper frame also includes the two angle iron bars 41—42 which are mounted on the part 23 as shown and connected at their outer ends by vertical bar 43. The plane of the parts 41—42—43 parallels the plane of the main tamper frame but is offset with relation thereto.

At 44 are two spaced, parallel and vertical fixed shafts mounted upon supporting parts 45—46 on bars 41—42. A cross head 47 is journalled on the shafts 44 for vertical reciprocatory movement thereon. A connecting rod 48 is connected to the cross-head 47 at 49 and to a crank 50 on the outer end of a shaft 51 passing through pipe 22. The shaft is driven by a connection 52 to a motor 53 mounted on the tamper frame.

A recess 54 is formed in the back of cross-head 47 to receive a plate 55 and the tamper bar 56. These parts are held in place in the recess by a plate 57 on the cross-head 47. The tamper bar 56 moves upwardly as the packed concrete overcomes the resistance of the friction applied by plate 55, this friction being regulated by a screw 58.

When the motor is in operation the tamper-bar is reciprocated at high speed, and due to the structure above described in detail it is held perfectly true to its axis of reciprocation. Also due to this construction the tamper-bar may be reciprocated at high speed without developing any material vibrations in the machine, thereby greatly reducing upkeep costs and materially lengthening its useful life.

Figure 3:
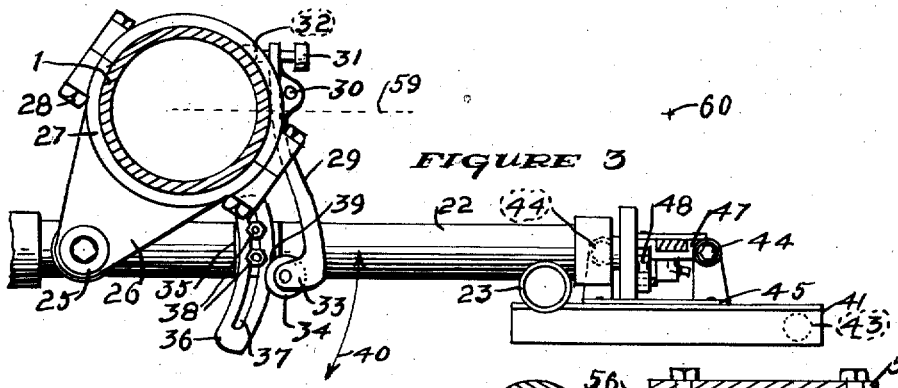
Figure 3 is a sectional view on line 3—3 of Figure 2.
Figure 4:
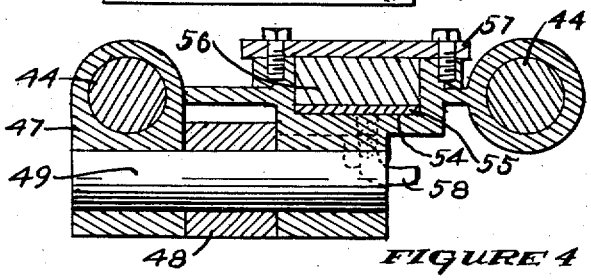
Figure 4 is an enlarged section on line 4—4 of Figure 2.
Figure 5:
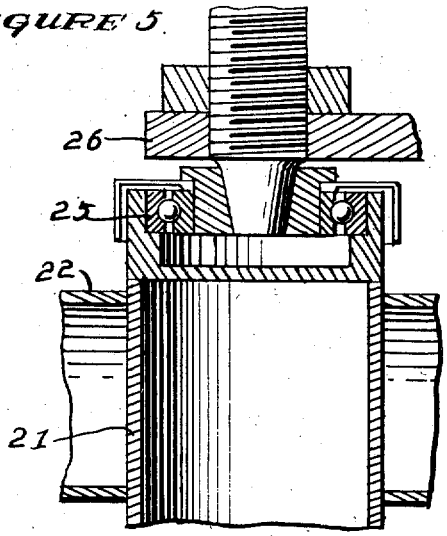
Figure 5 is an enlarged detail section through one of the adjustable tamping frame bearings.
Figure 6:
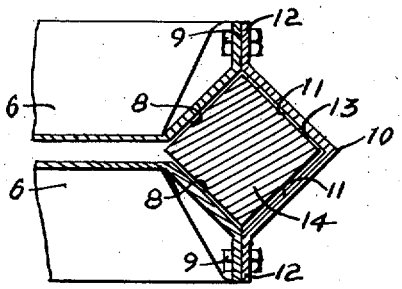
Figure 6 is an enlarged section on line 6—6 of Figure 1.

Referring to Figure 3 it is seen that when the tamper bar is set for the smallest sized pipe to be made the tamper frame lies in a plane parallel with the plane of the core holder frame, the core holder frame lying in plane 59 and the center of the core holder guide 13 being at 60. The axis of the tamper bar also lies in a plane normal to the plane of the core holder frame and including the axis 60, therefore when the tamper bar frame is swung outwardly as described for making pipe sections of larger diameter, the tamper bar itself changes its position but slightly relative to the body of the pipe, operating on one side of the pipe most remote from the plane of the core holder frame. Obviously, if it operated at a point closer to the plane of the core holder frame only pipe section more limited in diameter could be made.

It is to be understood, of course, that while we have herein shown and described but one specific embodiment of the invention, changes in form, construction, and method of assembly and operation may be made within the scope of the appended claims without departing from the spirit of the invention.

We claim:

1. In a concrete pipe making machine, the combination of a tubular frame, a subframe mounted thereon and extending beyond one end thereof, and in parallel but offset relation thereto, a cross-head mounted for vertical reciprocation in the subframe, a tamper bar mounted in the cross-head, a drive shaft journaled in the tubular frame and drivingly associated with the cross-head, a pivotal support for the other end of the tubular frame, and actuating instrumentalities associated with the drive shaft.

2. In a concrete pipe making machine, the combination of a vertical supporting column, a supporting frame eccentrically and pivotally mounted thereon to swing about a vertical axis, a tamper bar associated with the free end of said frame, a detent mounted on the column and extending laterally therefrom, and a detent engaging device associated with the frame intermediate the pivotal mounting and the tamper bar supporting end for adjustably positioning the frame about its pivotal mounting.

3. In a concrete pipe making machine, the combination of a vertical supporting column, a supporting frame eccentrically and pivotally mounted thereon to swing about a vertical axis, a tamper bar associated with the free end of said frame, a detent mounted on the column and extending laterally therefrom, and an arcuate member mounted on the frame in concentric relation to its axis of rotation and provided with notches to engage the detent for adjustable positioning of the frame.

4. In a concrete pipe making machine, the combination of a vertical supporting column, a supporting frame eccentrically and pivotally mounted thereon to swing about a vertical axis, a tamper bar associated with the free end of said frame, a resilient detent bar pivotally mounted on said column and extending laterally therefrom in the direction of said frame, a roller mounted in said arm, an arcuate member mounted on the frame in concentric relation to its axis of rotation and provided with notches to engage said roller for adjustably positioning the frame, and an adjusting device inserted between the arm and column to urge the roller into engagement with a notch.

5. In a concrete pipe making machine the combination of a support, a main frame mounted on the support for swinging movement relative thereto and projecting laterally out therefrom, a sub-frame mounted on the main frame and extending beyond one end thereof and in parallel but offset relation thereto, a pair of substantially parallel and vertically extending shafts mounted in the sub-frame, a cross head mounted for vertical reciprocatory movement on said shafts, a tamper bar mounted in the cross head, a drive shaft journaled on the frame and drivingly associated with said cross head the longitudinal axial line of the drive shaft intersecting the longitudinal axial lines of both of the vertical shafts, and actuating instrumentalities associated with the drive shaft.

6. In a concrete pipe making machine the combination of a support, a main frame mounted on and projecting laterally from the support, a subframe on the outer end of the main frame, a pair of spaced substantially parallel and vertically extending shafts supported in said sub-frame, a cross head journaled for vertical reciprocatory movement on said shafts, a tamping bar mounted in the cross head, a drive shaft mounted on the main frame and drivingly associated with the cross head the longitudinal axial line of the drive shaft intersecting the longitudinal axial lines of both of the vertical shafts, and actuating instrumentalities associated with the drive shaft.

7. In a concrete pipe making machine the combination of a support, a main frame mounted on the support and projecting laterally out therefrom, a sub-frame mounted on the main frame and extending beyond one end thereof in parallel but offset relation thereto, supporting parts projecting from the sub-frame toward the vertical plane of the main frame, a pair of substantially parallel and vertically extending shafts mounted in said supporting parts and so positioned that the longitudinal axes of the shafts intersect the vertical central plane of the main frame, a cross head mounted for vertical reciprocatory movement on said shafts, a tamper bar mounted in the cross head, a drive shaft mounted on the main frame with the axial line of its longitudinal axis substantially intersecting the axial lines of the vertical axes of both of the vertical shafts, such drive shaft being drivingly associated with said cross head, and actuating instrumentalities associated with the drive shaft.

8. In a concrete pipe making machine the combination of a support, a substantially rectangular main frame mounted on the support and projecting laterally out therefrom, a substantially rectangular sub-frame at the outer end of the main frame and parallel thereto, a pair of spaced vertical parallel shafts secured on the sub-frame, the vertical axes of which shafts intersect the vertical central plane of the main frame, a cross head, a journal sleeve rigidly connected with each end of the cross head, such sleeves being mounted for vertical reciprocatory movement on the vertical shafts, a tamper bar friction slide box formed in the cross head between the sleeves, a tamper bar held in frictional sliding contact within the box, a wrist pin fixed on the cross head with its axis lying in a plane parallel to the plane of the longitudinal axes of the vertical shafts, a drive shaft mounted on the main frame, the axial line of the longitudinal axis of such drive shaft intersecting the axial lines of the vertical axes of both of the said vertical shafts, a crank on the drive shaft, a connecting rod connected to the wrist pin and the crank, and actuating instrumentalities connected with the drive shaft.

JOHN N. KRISTICH.
NIKOLA B. PIRIACH.